(12) United States Patent
Budzyk et al.

(10) Patent No.: US 8,919,393 B2
(45) Date of Patent: Dec. 30, 2014

(54) FILLING SYSTEM FOR VEHICULAR FLUID CONTAINER

(75) Inventors: Laurent Budzyk, Mazinghien (FR); Paul Elong, Brussels (BE)

(73) Assignee: Inergy Automotive Systems Research S.A., Brussels (BE)

( * ) Notice: Subject to any disclaimer, the term of this patent is extended or adjusted under 35 U.S.C. 154(b) by 257 days.

(21) Appl. No.: 13/502,444

(22) PCT Filed: Oct. 14, 2010

(86) PCT No.: PCT/EP2010/065477
§ 371 (c)(1),
(2), (4) Date: Apr. 17, 2012

(87) PCT Pub. No.: WO2011/048016
PCT Pub. Date: Apr. 28, 2011

(65) Prior Publication Data
US 2012/0199246 A1   Aug. 9, 2012

(30) Foreign Application Priority Data
Oct. 21, 2009   (EP) ..................................... 09173578

(51) Int. Cl.
*B60K 15/04*   (2006.01)
(52) U.S. Cl.
CPC ...................................... *B60K 15/04* (2013.01)
USPC ............ 141/290; 141/369; 141/376; 141/392
(58) Field of Classification Search
USPC .......................... 141/290, 369, 375–376, 392
See application file for complete search history.

(56) References Cited

U.S. PATENT DOCUMENTS

| 5,476,125 | A | 12/1995 | Mitchell | |
|---|---|---|---|---|
| 5,562,133 | A | 10/1996 | Mitchell | |
| 6,263,924 | B1 | 7/2001 | Grosser | |
| 6,374,868 | B1 * | 4/2002 | Channing | 141/9 |
| 6,390,147 | B1 * | 5/2002 | Channing | 141/9 |
| 6,527,021 | B2 * | 3/2003 | Channing | 141/286 |
| 6,554,031 | B2 * | 4/2003 | Channing | 141/9 |
| 6,681,811 | B2 * | 1/2004 | Channing | 141/9 |

(Continued)

FOREIGN PATENT DOCUMENTS

| CA | 2 639 994 A1 | 8/2007 |
|---|---|---|
| DE | 43 44 273 A1 | 6/1995 |

(Continued)

OTHER PUBLICATIONS

Opposition Brief issued Apr. 25, 2014 in European Patent Application No. 10 765 447.7 (with partial English language translation).

*Primary Examiner* — Nicolas A Arnett
(74) *Attorney, Agent, or Firm* — Oblon, Spivak, McClelland, Maier & Neustadt, L.L.P.

(57) ABSTRACT

The invention is based on the insight that a filling system obtained by combining a "Kruse" compatible threaded socket and an annular magnet as required for the operation of the "Elaflex" nozzle, will exhibit air exchange problems related to the difference in the positioning of the respective air intake openings of the "Kruse" bottle and the "Elaflex" nozzle. More particularly, the invention is based on the insight that by judiciously providing a chamber in fluid communication with the volume of air or vapor in the tank, filling may be made possible with a "Kruse" bottle as well as with an "Elaflex" nozzle.

13 Claims, 6 Drawing Sheets

(56) References Cited

U.S. PATENT DOCUMENTS

| | | | |
|---|---|---|---|
| 7,866,357 B2 | 1/2011 | Compere et al. | |
| 2002/0170616 A1* | 11/2002 | Channing | 141/9 |
| 2002/0170621 A1* | 11/2002 | Channing | 141/286 |
| 2003/0150507 A1* | 8/2003 | Channing | 141/9 |
| 2007/0181215 A1 | 8/2007 | Kaempf | |
| 2008/0210331 A1 | 9/2008 | Compere et al. | |
| 2009/0321441 A1 | 12/2009 | Horlacher et al. | |
| 2011/0100985 A1 | 5/2011 | Tsiberidis | |
| 2012/0181274 A1 | 7/2012 | Fetzer | |
| 2013/0192714 A1* | 8/2013 | Wagner | 141/98 |
| 2013/0248048 A1* | 9/2013 | Behnamrad | 141/311 R |

FOREIGN PATENT DOCUMENTS

| | | |
|---|---|---|
| DE | 10241323 B3 | 5/2004 |
| DE | 20319414 U1 | 3/2005 |
| DE | 20040036508 A1 | 3/2006 |
| DE | 20 2006 009 585 U1 | 11/2006 |
| DE | 20050011575 U1 | 11/2006 |
| DE | 20 2007 018 245 U1 | 6/2009 |
| DE | 20080010988 B3 | 7/2009 |
| DE | 10 2008 049 150 A1 | 12/2009 |
| DE | 10 2009 029 362 A1 | 3/2011 |
| EP | 1502794 A2 | 2/2005 |
| FR | 2846713 A1 | 5/2004 |
| FR | 2879585 A1 | 6/2006 |
| JP | 04-317821 A | 11/1992 |
| JP | 05-008641 A | 1/1993 |
| JP | 05-032065 U | 4/1993 |
| JP | 05-044658 U | 6/1993 |
| JP | 05-162546 A | 6/1993 |
| JP | 07-237459 A | 9/1995 |
| JP | 07-257201 A | 10/1995 |
| JP | 08-258578 A | 10/1996 |
| JP | 2008-094270 A | 4/2008 |
| JP | 2008-094271 A | 4/2008 |
| WO | WO 2006/035013 A1 | 4/2006 |
| WO | WO 2009013558 | 1/2009 |

* cited by examiner

FILLING SYSTEM FOR VEHICULAR FLUID CONTAINER

CROSS-REFERENCE TO RELATED APPLICATIONS

This application is a U.S. national stage entry under 35 U.S.C. §371 of International Application No. PCT/EP2010/065477 filed Oct. 14, 2010, which claims priority to European application N° 09173578.7 filed on Oct. 21, 2009, the whole content of this application being incorporated herein by reference for all purposes.

This application claims priority to European application N° 09173578.7 filed on Oct. 21, 2009, the whole content of this application being incorporated herein by reference for all purposes.

BACKGROUND OF THE INVENTION

1. Field of the Invention

The present invention pertains to the field of filling systems for fluid tanks of motor vehicles, and more particularly systems for filling a tank with urea for use in vehicular emission control systems.

2. Description of the Related Art

As is generally known, motor vehicles require several different fluids for their operation, which may include fuel, cooling fluids, and urea. A general concern in the design of containers for these fluids is the need to prevent inadvertent filling of a container with a different fluid than the one for which it is intended. Such an erroneous fill-up can seriously damage the system that receives the wrong fluid, and, in the case of fluids for emission control systems such as urea-based NOx decomposition systems, it may cause non-compliance to the emission standards which the system in question is intended to ensure meeting.

Another concern in the design of filling systems for containers of vehicle fluids is the need to remove any vapor or gas present in the container during the process of filling the container with the desired fluid.

With respect to urea tanks, used for example in vehicles adapted to remove the NOx from the engine's exhaust fumes, the above concerns are addressed by two known systems.

The "Elaflex" system dispenses a urea solution from a nozzle spout with a diameter of approximately 19 mm and a compatibly sized socket mounted on the tank to receive the nozzle. The diameter of the socket is chosen in such a way that use of a standardized diesel or gasoline nozzle is physically prevented. Furthermore, in an approach similar to the one disclosed in U.S. Pat. No. 5,562,133 to Mitchell, the Elaflex socket contains a magnet of annular shape that cooperates with a magnetically actuated valve in the nozzle to authorize its operation. A disadvantage of the "Elaflex" system is that filling can only take place at a compatible filling station.

The "Kruse" system dispenses a urea solution from a bottle, which is screwed in an inverted position onto a threaded socket mounted on the tank. To allow the fluid to flow out of the "Kruse" bottle and into the tank, the bottle must be pressed down in order to switch the valve mounted on the bottle's protruding axis into an open position. The system will then on the one hand provide a flow of urea solution from the bottle into the tank, and on the other hand provide a corresponding flow of air and vapor from the tank to the bottle. A disadvantage of the "Kruse" system is that the fluid is dispensed rather slowly, compared to the "Elaflex" system.

Whereas each of the systems described above has its own advantages and disadvantages, some of which may be more pertinent to particular users than to others, it is particularly inconvenient and disadvantageous that vehicle designers have to choose compatibility with a single system, thereby precluding the use of the other system by the end user.

SUMMARY

It is an object of the present invention to reconcile the authorization system based on the presence of an annular magnet with a bottle-based system requiring a coupling.

This object is reached by the operation of the characterizing features of the independent claims.

The invention is based on the insight that a filling system obtained by combining a "Kruse" compatible threaded socket and an annular magnet as required for the operation of the "Elaflex" nozzle, will exhibit air exchange problems related to the difference in the positioning of the respective air intake openings of the "Kruse" bottle and the "Elaflex" nozzle. More particularly, the invention is based on the insight that by judiciously providing a chamber in fluid communication with the volume of air or vapor in the tank, filling may be made possible with a "Kruse" bottle as well as with an "Elaflex" nozzle.

According to an aspect of the present invention, there is provided a fitting for the filling opening of a vehicular fluid tank, comprising a tubular main body having a first end for connection with said tank and a second end adapted to receive a spout, the main body being adapted to be equipped with a magnet substantially spanning the circumference of said main body for authorizing a flow in said spout, and a tubular coupling section at said second end, wherein said tubular coupling section is adapted to detachably couple to a bottle having a fluid outlet and an air intake, wherein the fitting comprises a chamber between the second end and the magnet, wherein, when in use, an end of a first ventilation conduit is present in the chamber, the first ventilation circuit being in fluid communication with a volume of gas present at the tank side of the fitting, such that in the coupled position of the bottle the air intake is located in the chamber and the fluid outlet flows out in the direction of the first end, and wherein, in use, an end of a second ventilation conduit is present in the tubular main body on the tank side of the magnet, the second ventilation conduit being in fluid communication with the volume of gas present at the tank side of the fitting.

European Patent 1 502 794 to Jost Automotive GmbH discloses a device for avoiding wrong refueling in motor vehicles, in particular in relation to containers for urea. This device consists of a fitting for receiving a spout, the fitting including a magnet as used in the "Elaflex" system. The tank opening exhibits a protrusion with an outer thread to receive a cap.

In an exemplary embodiment of the fitting of the present invention, the bottle is a screw-on bottle, and said tubular coupling section has a thread for detachably coupling to the bottle. In a particular embodiment, the tubular coupling section is adapted for being coupled with a Kruse bottle, such that the fluid outlet substantially seals the chamber from the first end in the coupled position of the Kruse bottle. This embodiment has the advantage that it allows the vehicle's operator to use either an "Elaflex" dispenser or a "Kruse" bottle, depending on the availability of either source, with the same tank, while still preventing a filling of the tank with improper fluids.

In an exemplary embodiment of the fitting of the present invention, the tubular main body comprises a peripheral groove for holding the magnet, and one of the first ventilation conduit and the second ventilation conduit extends substantially axially through said groove. In a particular embodiment, said one of said first ventilation conduit and said second ventilation conduit is embedded in an axial ridge intersecting said radial groove.

The fluid communication between the chamber and the volume of gas present at the tank side of the fitting may be provided by the combined operation of the first ventilation conduit and the second ventilation conduit, i.e., the first ventilation conduit may provide fluid communication between the chamber and the tank side of the main body, which is in fluid communication with the volume of gas via the second conduit.

The fluid communication between the tank side of the main body and the volume of gas present at the tank side of the fitting may be provided by the combined operation of the first ventilation conduit and the second ventilation conduit, i.e., the second ventilation conduit may provide fluid communication between the tank side of the main body and the chamber, which is in fluid communication with the volume of gas via the first conduit.

In a more particular embodiment, the fitting comprises a magnet consisting of an interrupted ring situated in said peripheral groove, wherein the interruption is adapted to flank said one of said first ventilation conduit and said second ventilation conduit. In a more particular embodiment, the interrupted ring extends over a sector measuring between 20° and 40°. A sector in this range balances the proper operation of the magnet with a limited pressure drop between the compartments. It is an advantage of this embodiment that only a single ventilation conduit passes on the outside of the main body, while the other ventilation conduit provides ventilation between the tank side and the coupling side of the main body with a minimal use of space and ensuring a relatively high flow level.

In an exemplary embodiment, one of said first ventilation conduit and said second ventilation conduit is formed by a central cavity of the tubular main body, said central cavity receiving a part of the bottle in the coupled position, wherein the central cavity is dimensioned with a radius that exceeds a radius of the received part of the bottle in an amount sufficient to provide fluid communication between the chamber and the tank side of the main body.

The fluid communication between the chamber and the volume of gas present at the tank side of the fitting may be provided by the combined operation of the first ventilation conduit and the second ventilation conduit, i.e., the first ventilation conduit may provide fluid communication between the chamber and the tank side of the main body, which is in fluid communication with the volume of gas via the second conduit.

The fluid communication between the tank side of the main body and the volume of gas present at the tank side of the fitting may be provided by the combined operation of the first ventilation conduit and the second ventilation conduit, i.e., the second ventilation conduit may provide fluid communication between the tank side of the main body and the chamber, which is in fluid communication with the volume of gas via the first conduit.

In an exemplary embodiment, the fitting of the present invention comprises a funnel shaped section at the first end.

In an exemplary embodiment, the fitting of the present invention comprises a connecting flange near the second end, and the tubular coupling section protrudes beyond the flange.

In an exemplary embodiment, the fitting of the present invention comprises a constricted zone with a reduced inner diameter, substantially equal to the diameter of the spout and the outlet of the bottle.

An exemplary embodiment of the present invention provides a vehicular fluid tank comprising a fitting according to the invention.

BRIEF DESCRIPTION OF THE DRAWINGS

The foregoing and other advantages of the present invention will be further clarified in relation to the enclosed Figures, in which.

DETAILED DESCRIPTION OF THE INVENTION

Figure 1A:
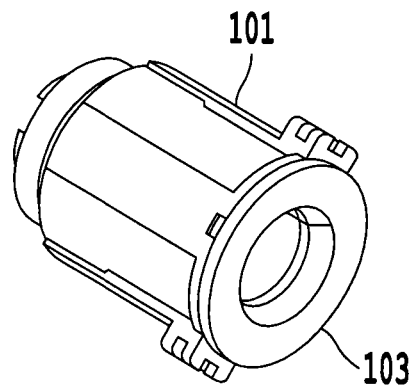
FIG. 1a illustrates a fitting according to the prior art "Elaflex" filling system.
Figure 1B:
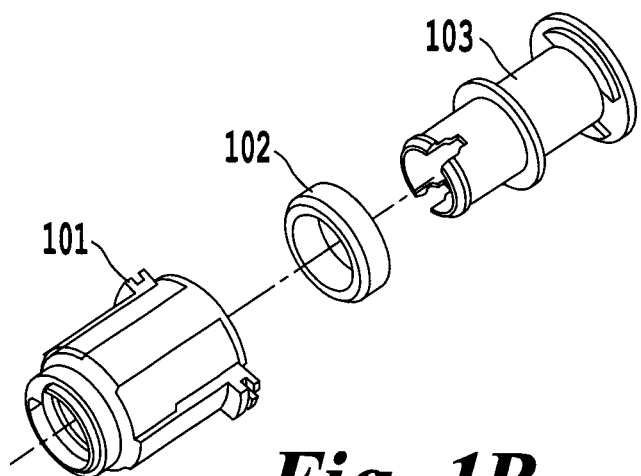
FIG. 1b provides an exploded view of the fitting of FIG. 1a, drawing attention to the presence of an annular magnet therein.

FIG. 1 illustrates a fitting 100 according to the prior art "Elaflex" filling system. In FIG. 1a, the fitting 100 is assembled for use, while FIG. 1b provides an exploded view, drawing attention to the different parts comprised in the fitting. The "Elaflex" fitting 100 is equipped with a ring magnet 102, the magnetic field of which acts on a magnetically actuated switch present in an "Elaflex" compatible spout. Only when an appropriate magnetic field is applied to this switch, a flow of urea solution through the spout is authorized. This prevents filling up a tank intended for a different fluid with a urea solution, because other tanks would not be equipped with a magnet. The circular symmetry of the magnetic field provided by the ring magnet 102 ensures proper operation regardless of the angular positioning of the fitting in the fluid tank, and regardless of the angular positioning of the spout in the fitting.

A further preventive measure against inadvertent filling of the urea tank with a different fluid is provided by the diameter of the inner tube 103 of the fitting 100. The diameter of this inner tube 103 is less than the diameter of a standardized spout for dispensing gasoline or diesel fuel. Hence, it is mechanically impossible to enter such a fuel spout in the fitting 100 of a urea tank.

The "Elaflex" spout will shut off when it detects that the level of liquid in the tank has reached the spout. More specifically, the spout will shut off when the spout opening is no longer in contact with air, i.e. no longer ventilated. This implies a need for proper ventilation of the space in which the spout opening is placed, in order for the spout to function properly up to the point where the tank is full.

Furthermore, the air and/or vapor present in the tank needs to be able to escape from the tank at the rate at which the urea solution is fed into it. If the spout is not equipped with an internal vapor recovery system, these gases will typically escape through the part of the inner tube 103 that is not obstructed by the spout. It is therefore important that the air and/or vapor be allowed to efficiently reach the opening at the tank side of the fitting.

The above ventilation constraints are easily met with the "Elaflex" fitting illustrated in FIG. 1, because it is relatively short and straight, posing no particular obstruction for the described air return paths.

Figure 2:
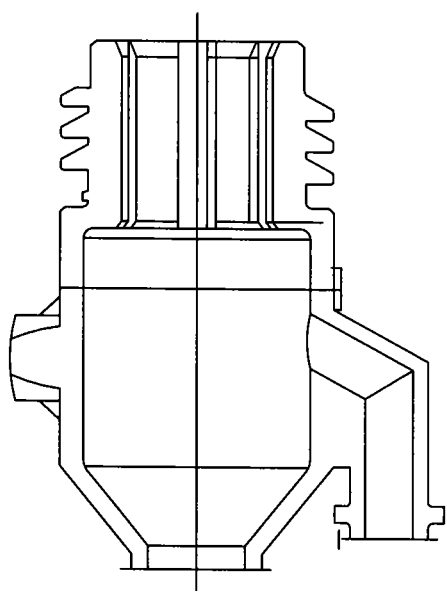
FIG. 2 provides a sectional view of a fitting according to the prior art "Kruse" filling system.

FIG. 2 illustrates an embodiment of a fitting according to the "Kruse" system.

Figure 3:
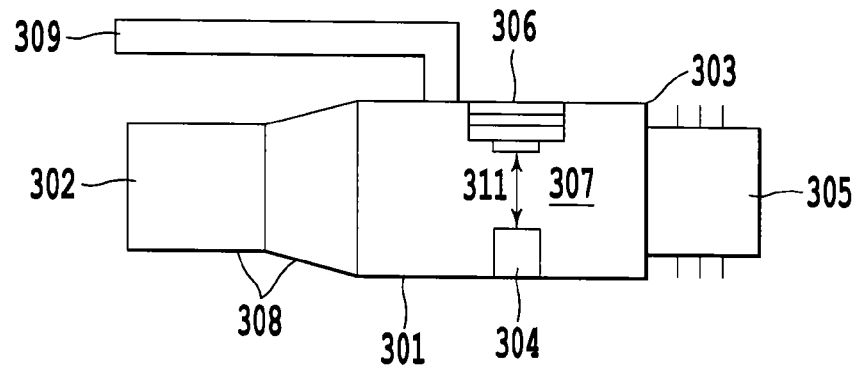
FIGS. 3-6 provide sectional views of various embodiments of a fitting according to the invention, drawing attention to the different parts of the main body to be ventilated.

FIG. 3 illustrates an embodiment of the fitting according to the present invention. The fitting 300 comprises a tubular main body 301 having a first end 302 for connection with said tank and a second end 303 adapted to receive a spout. Optionally, the tubular main body 301 has a funnel shaped section 308 at the first end 302.

Figure 10:
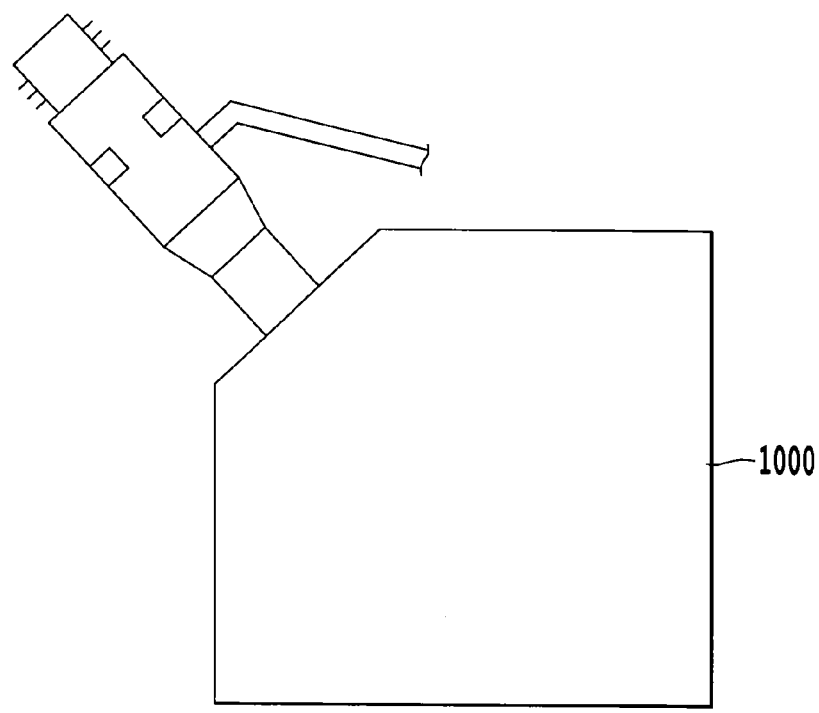
FIG. 10 illustrates an exemplary embodiment of a fitting attached to a vehicle vehicular fluid tank.

The fitting may be produced from polyamide, polyethylene, or other materials with suitable properties. As illustrated in FIG. 10, the fitting may be permanently attached to the filling opening of a fluid tank by means of welding or any other suitable attachment process. Alternatively, the first end may be formed as a hose tail for attaching a flexible hose leading to the fluid tank.

The main body 301 is adapted to be equipped with a magnet 304 substantially spanning the circumference of the main body 301 for authorizing a flow in the spout. The fitting further comprises a tubular coupling section 305 at said second end 303. The tubular coupling section 305 is adapted to detachably couple to a bottle such that a protruding part of this bottle substantially seals the fitting both near the tubular coupling section 305 and near the magnet 304, thus creating a closed chamber 307 between the tubular coupling section 305 and the magnet 304.

Figure 9:
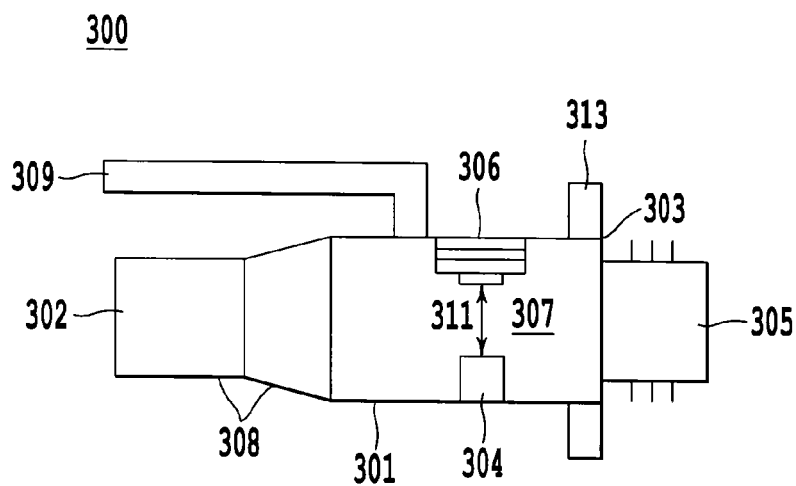
FIG. 9 illustrates an exemplary embodiment of a fitting according to the invention with a flange.

As illustrated in FIG. 9, the tubular coupling section 305 is optionally provided in the form of a threaded protrusion extending beyond a plane or a flange 313 at the second end 303.

In the embodiment illustrated in FIG. 3, a first ventilation conduit 306 is embedded in a ridge passing through a constricted zone 311 holding the magnet 304. The main body 301 is also ventilated at the tank side, outside the chamber 307. A second ventilation conduit 309 is provided for this purpose. The second ventilation conduit 309 is in fluid communication with a volume of gas present at the tank side of the fitting. The first ventilation conduit 306 is in fluid communication with that volume of gas via the second ventilation circuit 309.

It is possible to achieve a similar result with a configuration in which the first ventilation circuit provides direct fluid communication between the chamber 307 and the volume of gas at the tank side, the first ventilation conduit passing on the outside of the main body 301, and in which the second ventilation conduit is embedded in a ridge passing through the constricted zone 311 holding the magnet 304. The second ventilation conduit 306 is in fluid communication with the volume of gas at the tank side via the first ventilation circuit 309.

Figure 4:
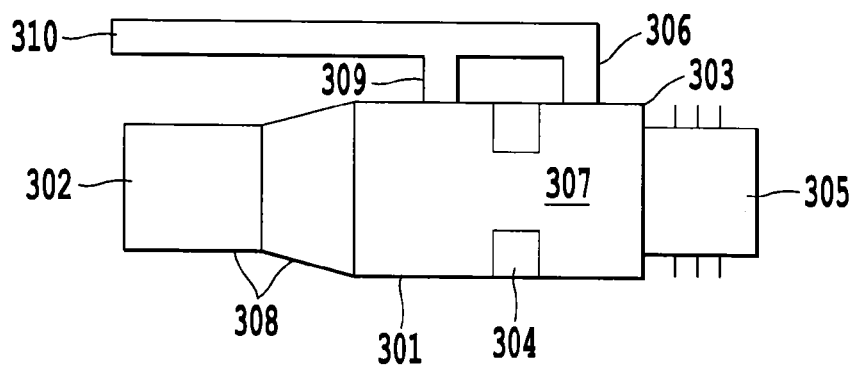

In the embodiment illustrated in FIG. 4, the first ventilation conduit 306 and the second ventilation conduit 309 are bifurcations of a single ventilation conduit 310 in fluid communication with a volume of gas present at the tank side of the fitting 300.

Figure 5:
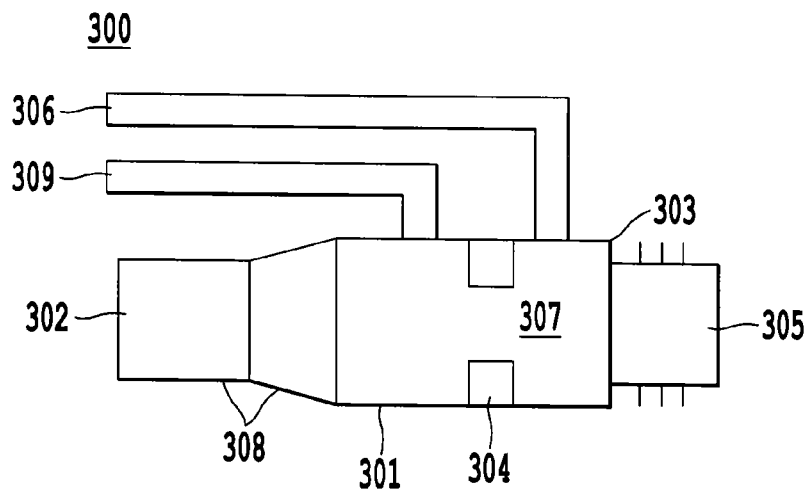

In the embodiment illustrated in FIG. 5, the fitting comprises a first ventilation conduit 306 ending in the chamber 307, the first ventilation conduit 306 being in fluid communication with a volume of gas present at the tank side of the fitting. The main body 301 is also ventilated at the tank side, outside the chamber 307, by means of separate second ventilation conduit 309. The second ventilation conduit 309 is also in fluid communication with a volume of gas present at the tank side of the fitting.

Figure 6:
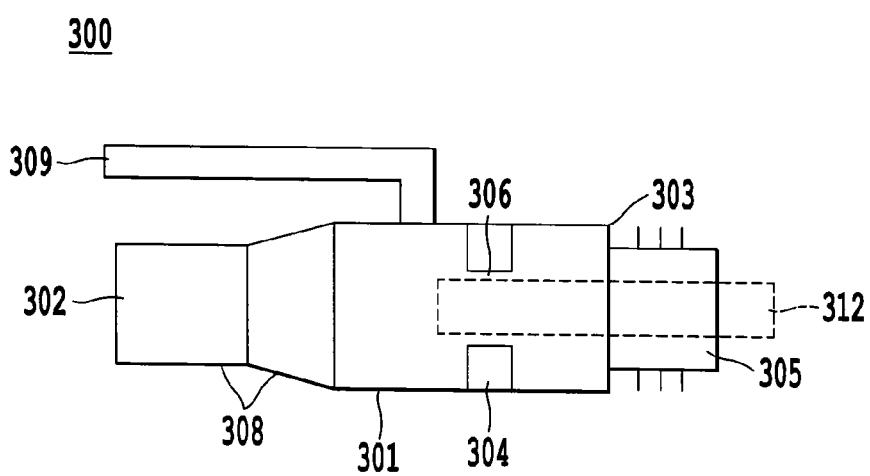

In the embodiment illustrated in FIG. 6, the first ventilation conduit 306 is formed by a central cavity of the tubular main body 301, the central cavity receiving a part of the bottle 312 in the coupled position, wherein the central cavity is dimensioned with a radius that exceeds a radius of the received part of the bottle 312 in an amount sufficient to provide fluid communication between the chamber 307 and the tank side of the fitting.

It is possible to achieve a similar result with a configuration in which the first ventilation conduit 306 provides direct fluid communication between the chamber 307 and the volume of gas at the tank side, the first ventilation conduit passing on the outside of the main body 301, and in which the second ventilation conduit is formed by a central cavity of the tubular main body 301, the central cavity receiving a part of the bottle 312 in the coupled position, wherein the central cavity is dimensioned with a radius that exceeds a radius of the received part of the bottle 312 in an amount sufficient to provide fluid communication between the chamber 307 and the tank side of the main body. The second 10 ventilation conduit 306 is in fluid communication with the volume of gas at the tank side via the first ventilation circuit 309.

Figure 7:
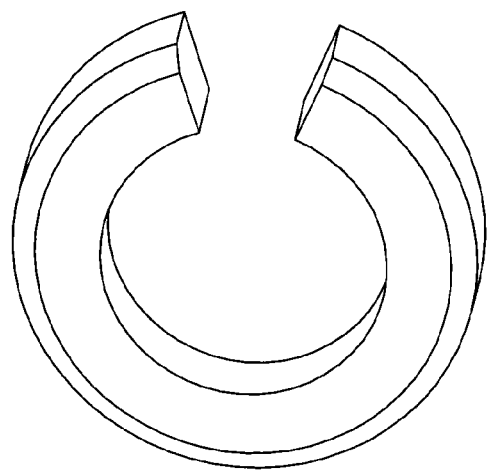
FIG. 7 illustrates an essentially annular magnet with a sector-shaped opening of approximately 40° as characteristic of an embodiment of the present invention.

FIG. 7 provides a perspective view of a magnet in the shape of an interrupted ring, as may be used in the embodiment illustrated in FIG. 3. The sector over which the ring is interrupted preferably measures between 20° and 40°.

Figure 8:
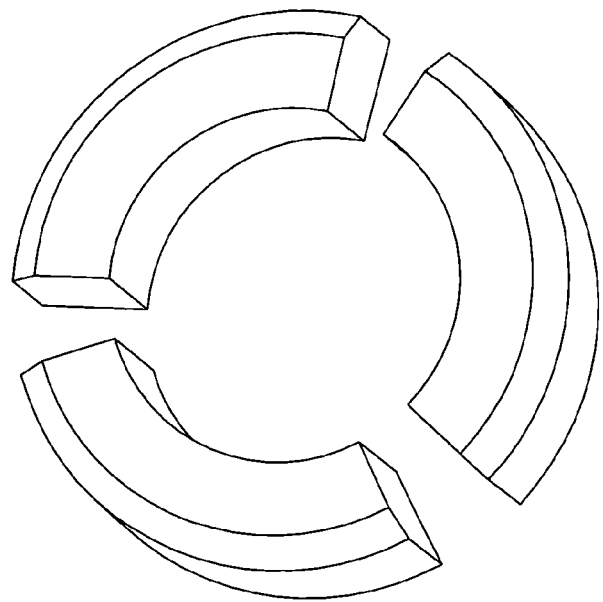
FIG. 8 illustrates a substantially annular magnet composed of three parts extending over approximately 100° each, as characteristic of an embodiment of the present invention.

FIG. 8 provides a perspective view of a magnet in the shape of a ring with two interruptions, i.e., a magnet consisting of three separate sector-shaped elements. The concept of a substantially annular magnet or a magnet consisting of an interrupted ring, as used in the present application, must be understood to also refer to combinations of multiple parts, substantially extending along a ring, as illustrated in an exemplary way in FIG. 8.

The invention claimed is:

1. A fitting for the filling opening of a fluid tank, comprising:
   a tubular main body having a first end for connection with said tank and a second end adapted to receive a spout, said main body being adapted to be equipped with a magnet substantially spanning the circumference of said main body for authorizing a flow in said spout, and a tubular coupling section at said second end,
   wherein said tubular coupling section is adapted to detachably couple to a bottle having a fluid outlet and an air intake,
   wherein said fitting comprises a chamber between said second end and said magnet,
   wherein, when in use, an end of a first ventilation conduit is present in said chamber, said first ventilation conduit being in fluid communication with a volume of gas present at said first end for connection with said tank, such that in the coupled position of said bottle said air intake is located in said chamber and said fluid outlet flows out in the direction of said first end, and
   wherein, when in use, an end of a second ventilation conduit is present in said tubular main body at said first end for connection with said tank, said second ventilation conduit being in fluid communication with said volume of gas present at said first end for connection with said tank.

2. The fitting of claim 1, wherein said bottle is a screw-on bottle, and wherein said tubular coupling section has a thread for detachably coupling to said bottle.

3. The fitting of claim 2, wherein said tubular coupling section is adapted for being coupled with said bottle, such that said fluid outlet substantially seals said chamber from said first end in the coupled position of said bottle.

4. The fitting of claim 1, wherein said tubular main body comprises a peripheral groove for holding said magnet and that one of said first ventilation conduit and said second ventilation conduit extends substantially axially through said groove.

5. The fitting of claim 4, wherein said one of said first ventilation conduit and said second ventilation conduit is embedded in an axial ridge intersecting said radial groove.

6. The fitting of claim 4, wherein the magnet has an interrupted ring situated in said peripheral groove, wherein a section over which the interrupted ring is interrupted is adapted to flank said one of said first ventilation conduit and said second ventilation conduit.

7. The fitting of claim 6, wherein the section over which the interrupted ring is interrupted extends over a sector measuring between 20° and 40°.

8. The fitting of claim 1, wherein one of said first ventilation conduit and said second ventilation conduit is formed by a central cavity of the tubular main body, said central cavity receiving a part of the bottle in the coupled position, and wherein the central cavity is dimensioned with a radius that exceeds a radius of the received part of the bottle in an amount sufficient to provide fluid communication between the chamber and the tank side of the main body.

9. The fitting of claim 1, wherein said first and said second ventilation conduit are bifurcations of a single conduit in fluid communication with said volume of gas present at said first end for connection with said tank.

10. The fitting of claim 1, further comprising a funnel shaped section at said first end.

11. The fitting of claim 1, further comprising a connecting flange near said second end, and wherein said tubular coupling section protrudes beyond said flange.

12. The fitting of claim 1, further comprising a constricted zone with a reduced inner diameter, substantially equal to the diameter of said spout and said outlet of said bottle.

13. A vehicular fluid tank, comprising the fitting according to claim 1.

* * * * *